United States Patent [19]

Kiessling

[11] Patent Number: 4,704,437

[45] Date of Patent: Nov. 3, 1987

[54] PROCESS FOR THE PREPARATION OF SOLUBLE SYNTHETIC RESINS WHICH ARE FREE FROM MONOMERIC AMINES AND HAVE NH BONDS, AND THEIR USE

[75] Inventor: Hans-Joachim Kiessling, Eppstein, Fed. Rep. of Germany

[73] Assignee: Hoechst AG, Fed. Rep. of Germany

[21] Appl. No.: 924,360

[22] Filed: Oct. 28, 1986

[30] Foreign Application Priority Data

Oct. 30, 1985 [DE] Fed. Rep. of Germany ....... 3538548

[51] Int. Cl.$^4$ .............................................. C08G 59/14
[52] U.S. Cl. ............................. 525/327.3; 204/181.7; 525/381; 525/382; 525/523; 525/528; 528/121; 528/123; 523/410; 523/417
[58] Field of Search ............................ 528/121, 123; 525/327.3, 523, 528, 381, 382

[56] References Cited

U.S. PATENT DOCUMENTS

| | | | |
|---|---|---|---|
| 4,031,050 | 6/1977 | Jerabek | 525/528 X |
| 4,308,085 | 12/1981 | Hörhold et al. | 528/121 X |
| 4,419,467 | 12/1983 | Wismer et al. | 525/528 X |
| 4,507,412 | 3/1985 | Hickner et al. | 525/528 X |

Primary Examiner—Earl Nielsen
Attorney, Agent, or Firm—Bierman & Muserlian

[57] ABSTRACT

Process for the preparation of soluble synthetic resins which are free from monomeric amines and have NH bonds by reaction of (A) compounds which carry epoxide groups with (B) polyamines, in which the reaction is carried out in a homogeneous phase system in the absence or presence of resin solvents, the polyamine (B) being employed in excess and the resulting reaction product being freed from the unreacted polyamine portions by circulatory distillation in the presence of a resin solvent with the addition of water and supply of heat. The synthetic resins thus prepared are employed as self-crosslinking binders and in combination with crosslinking agents or in modified form for coatings or impregnations.

13 Claims, No Drawings

PROCESS FOR THE PREPARATION OF SOLUBLE SYNTHETIC RESINS WHICH ARE FREE FROM MONOMERIC AMINES AND HAVE NH BONDS, AND THEIR USE

Soluble synthetic resins which are free from monomeric amines and have NH bonds are of considerable industrial interest as crosslinkable binders for coatings and impregnations since systems which can be diluted with water can be built up by salt formation of the basic functional groups, and furthermore the high reactivity of the NH bonds is available for crosslinking reactions. Monomeric amine compounds which usually enter the system as impurities of such synthetic resins with NH bonds during preparation reduce the binder quality on the one hand in respect of odour and toxicity, and on the other hand, especially in aqueous systems after protonation, by the formation of low molecular weight amine salts, so that in the case of use as cataphoresis binders, the conductivity of the cataphoresis bath is influenced in an undesirable manner.

Synthetic resins with NH bonds can in general be prepared by two processes, in particular by reaction of resins which carry epoxide groups with polyamine-ketimines or with polyamines in excess. German Offenlegungsschrift No. 2,737,375 describes the reaction of epoxy resins with polyamines in excess. However, no synthetic resins which are free from monomeric amines are obtained by this process. According to the information, polyepoxy resins which are derived from divalent phenols, for example bisphenol A and epichlorohydrin, are reacted with a polyamine which contains it least two amine nitrogen atoms and at least 3 amine hydrogen bonds per molecule, preferably triethylenetetramine, at least 1.5 mole of polyamine, preferably 10 mole of polyamine, being used for each epoxide group in the epoxy resin and the unreacted polyamine being distilled off. Soluble synthetic resins with NH bonds are obtained in this known process, but they are dark yellow to brown in color and still contain 3,000 to 20,000 ppm of free polyamine.

Soluble resinous polymers which are virtually free from monomers and contain primary and/or secondary amino groups are known from German Offenlegungsschrift No. 3,412,657. They are prepared by reaction of copolymers based on glycidyl methacrylate with compounds containing NH bonds in a homogeneous phase system, the excess of NH compounds being removed by distillation after the reaction. However, relatively large quantities of the resin solvent used as the entraining agent and contaminated with small amounts of amine are obtained and must be purified in a cumbersome manner for recovery.

It was therefore desirable to have a process which avoids relatively large amounts of impure solvents being obtained and thereby makes reprocessing or waste disposal operations unnecessary and therefore also preserves the environment.

The invention relates to a process for the preparation of soluble synthetic resins which are free from monomeric amines and have NH bonds by reaction of (A) compounds which carry epoxide groups with (B) polyamines, in which the reaction is carried out in a homogeneous phase system in the absence or presence of resin solvents, the polyamine (B) being employed in excess and the resulting reaction product being freed from the unreacted polyamine portions by recycling codistallation in the presence of a resin solvent with the addition of water and supply of heat.

Light-colored to colorless products which contain less than 1,000 ppm, preferably less than 300 ppm, of free non-bonded polyamine can be prepared by the process according to the invention. In the process according to the invention, the compounds which carry epoxide groups are reacted with the polyamines in a homogeneous phase system. In principle, this reaction can indeed also be carried out in a non-homogeneous phase system; however, partial or complete crosslinking of the soluble synthetic resin may occur here. Depending on the solubility parameters of the compounds which carry epoxy groups and the dissolving power of the polyamine, the homogeneous phase system can be achieved by using a relatively large excess of polyamines or by using a suitable solvent. If the polyamines are simultaneously used in the reaction as solvents for the compound which carries epoxide groups, a relatively large excess of polyamines is advantageously chosen, so that the ratio of equivalence between the NH bonds of the polyamine and the glycidyl groups in the synthetic resin which carries epoxide groups can in this case be substantially greater than 12:1. For the polyamine reaction between the NH bonds in the polyamine on the one hand and the glycidyl groups ( å ) in the synthetic resin on the other hand, a minimum ratio of equivalence is necessary, and in particular an excess of NH bonds. This ratio depends on the content of glycidyl groups and the molecular weight of the synthetic resin and the number of NH bonds in the polyamine compound, but is also influenced by the solids content of the synthetic resin solutions to be reacted and is 8:1, preferably at least 12:1 and not more than 36 : 1. In the case of polyamines with 4 NH bonds, such as ethylenediamine, an NH/ å ratio of at least 8:1 is advantageously chosen, whilst polyamines with 5 NH bonds in the molecule, such as diethylenetriamine, are rather employed in an even greater excess, that is to say in an NH/ å ratio of at least 10:1.

The compounds which carry epoxide groups are present as 100% pure resins or as resin solutions, in which case the solids content of the resin solutions can be 20 to 90% by weight. The resin concentration in the polyamine reaction should advantageously be chosen at a lower value the more NH bonds the polyamine contains and the lower the NH/ å ratio used.

The minimum ratios of equivalence apply to synthetic resins with contents of epoxide groups of 10 to 25% by weight and average molecular weights of 5,000 to 30,000. As the average molecular weight increases and the content of glycidyl groups in the copolymer increases, relatively high NH/ å ratios are advantageously chosen in the minimum equivalent ratio range mentioned. In the region of average molecular weights of below 5,000, for example in the range from 312 to 4,000, the ratios of equivalence can fall below the minimum ratios mentioned at epoxide group contents of less than 10% by weight without the risk of gelling.

In the process according to the invention, after the reaction of the polyamine with the glycidyl groups of the synthetic resin, a solvent is added as an entraining agent, if the reaction mixture does not already contain it, and the reaction mixture obtained is subsequently heated until the solvent boils under reflux and flows back into the reaction mixture via a separator. Water is then metered in at a rate such that it does not accumulate in the reaction mixture but is immediately removed by distillation and separated off in the separator. In the case of resin solvents which form an azeotrope with water, this is advantageously achieved by keeping the reaction mixture at least 5° C., preferably more than 10° C., above the boiling point of the water/resin solvent azeotrope so that the water added is immediately entrained out of the reaction mixture. To achieve a high throughput of water, the maximum possible amount of heat is supplied to the reaction mixture and the addition of water is matched to this. In such a procedure, the excess diamine can be removed with relatively little water in a short time. The water consumption depends, inter alia, on the difference between the boiling points of the polyamine and the resin solvent; the amount of water required to remove residual ethylenediamine is thus reduced, for example, if the higher-boiling cumene is used instead of xylene as the resin solvent and entraining agent.

The recycling codistillation with water described above can be carried out under atmospheric pressure or reduced pressure. The latter, in general at temperatures below 1000° C., preferably below 70° C., is advantageous if light-colored to colorless resins are to be prepared, for example as covering or single-layer lacquer binders.

The recycling codistillation process with water is continued until 100 g of the resin solvent distilled off under anhydrous conditions consume 1 to 50 ml, preferably less than 10 ml, of 0.1N in general methanolic hydrochloric acid. The products obtained in this manner have no amine odor and are virtually free from monomeric polyamine residues, that is to say the content of monomeric polyamine is less than 50 ppm.

Resin solvents which are suitable as the entraining agent are in general not completely miscible with water and have boiling points under atmospheric pressure of 110° to 270° C., preferably 140° to 200° C. These are, for example, aromatic and aliphatic hydrocarbons, such as toluene, xylene, ethylbenzene, cumene, tetralin, Solvesso 150 (Esso AG) and Solvesso 200, but preferably xylenes, or alkyl-substituted benzenes in the boiling point range from 140° to 180° C., such as cumene, and furthermore ethers with 6 to 12 C atoms, such as dibutyl ether, anisole and diphenyl ether, preferably dibutyl ether, monohydric alcohols with 4 to 8 C atoms, such as butanols and hexanols, and ether-alcohols, such as n-butoxy-propanol.

In choosing the resin solvents suitable as entraining agents, mixtures of the resin solvents mentioned can also be used, the choice of solvent depending above all on the solution properties of the compound which carries epoxide groups and is to be reacted with the polyamine, since the polyamine reaction should take place in a homogeneous phase system.

All the compounds which carry epoxide groups and are soluble in the organic solvents mentioned or in the polyamine envisaged for the reaction and, apart from the epoxide group, contain no unstable bonds in the molecule, that is to say no groups which can easily be hydrolysed under alkaline conditions, which lead to molecular cleavage in the rolyamine reaction can in principle be employed in the polyamine reaction. Polyamine reaction products of epoxy resins based on polyphenols and epihalogenohydrin, preferably epichlorohydrin, and glycidyl methacrylate copolymers, which contain styrene, substituted styrenes and methacrylic acid esters as comonomers, are preferably employed in the preparation process according to the invention.

Possible epoxy resins of bifunctional bisphenols (I) or phenols (II) with a higher functionality are those with the following structures:

$$CH_2\underset{O}{-\!\!-\!\!-}CH.CH_2.O.(C_6H_4.CR^1R^2.C_6H_4.O.CH_2.CHOH.CH_2.O)_nC_6H_4.CR^1R^2.C_6H_4.O.CH_2.CH\underset{O}{-\!\!-\!\!-}CH_2 \quad I$$

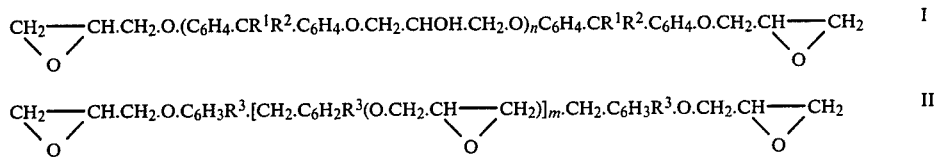

$$CH_2\underset{O}{-\!\!-\!\!-}CH.CH_2.O.C_6H_3R^3.[CH_2.C_6H_2R^3(O.CH_2.CH\underset{O}{-\!\!-\!\!-}CH_2)]_m.CH_2.C_6H_3R^3.O.CH_2.CH\underset{O}{-\!\!-\!\!-}CH_2 \quad II$$

In the formulae, $R^1$, $R^2$ and $R^3$ denote hydrogen or aliphatic alkyl radicals with up to 4 C atoms, but preferably hydrogen or methyl groups. The average molecular weight is between 312 and 4,000, preferably 900 and 2,000, in the case of formula I and between 474 and 5,000, preferably between 474 and 3,000, in the case of formula II. The average values for m and n are given by these average molecular weights, taking into consideration the substituents $R^1$, $R^2$ and $R^3$.

Epoxide compounds with structures of the formula I are obtained by reaction of bisphenols and epihalogenohydrin, and those with structures of the formula II are obtained from novolacs and epihalogenohydrin, epichlorohydrin being preferred for these reactions.

The copolymers based on glycidyl methacrylate which are suitable for the process according to the invention in general have an average molecular weight of 1,000 to 100,000. The content of glycidyl methacrylate is advantageously 1 to 80, preferably 5 to 40% by weight. They contain as comonomers, for example, styrene, styrenes which are substituted on the benzene nucleus, such as the various vinyltoluenes, methacrylic acid esters of alcohols with 1 to 18, preferably 1 to 12, carbon atoms, vinyl esters of carboxylic acids which are branched in the α position, acrylamide and derivatives thereof, methacrylamide and derivatives thereof or mixtures of these monomers. Styrene, styrenes which are substituted on the benzene nucleus and methacrylic acid esters with 1–10 carbon atoms in the ester group are preferably employed. Suitable copolymers can also contain proportions, for example up to 30, in particular up to 10 mol %, based on the total comonomers, of the glycidyl methacrylate copolymer, of acrylic, maleic or fumaric acid esters of the abovementioned alcohols. In this case, increased amide formation in the reaction with the polyamine must be reckoned with, so that the reaction should be carried out with a higher excess of polyamine and/or with a lower solids content in the reaction mixture.

The polymerization of the monomer mixture containing glycidyl methacrylate is carried out by customary processes; free radical polymerization with aliphatic azo compounds is particularly suitable.

Examples of suitable polyamines are aliphatic primary or secondary diamines with 2 to 6 carbon atoms, such as ethylenediamine, the various diaminopropanes, -butanes, -pentanes and -hexanes, the monomethyl compounds of ethylene- and propylenediamine, amino-ethers with 2 amino groups in the molecule, such as diaminodiethyl ether, and polyamines, such as diethylenetriamine, dipropylenetriamine and others. Those polyamines which contain more than 2, preferably more than 3, NH bonds in the molecule are particularly suitable.

The build-up of the resulting synthetic resins which carry amino groups and their properties can be varied within a wide range, for example by

- the ratio of the "hard" and "soft" molecular segments in the compounds which carry epoxide groups
- the molecular weight of the compounds which carry epoxide groups
- their content of epoxide groups
- the choice of polyamines.

In the case of glycidyl methacrylate copolymers, the ratio of the "hard" to "soft" segments in the molecular is determined by the "hard" and "soft" monomers employed in the preparation of the copolymer.

Monomers which are designated as soft are those which plasticize the polymer resin which carries amino groups, and those which are designated as hard are those which make the polymer resin rigid. Suitable soft monomers are, for example, the methacrylic acid esters of $C_4$–$C_8$-alcohols, such as butyl methacrylate and 2-ethylhexyl methacrylate; examples of possible hard monomers are styrene and/or the various vinyltoluenes and/or methyl methacrylate.

The content of basic nitrogen atoms and NH bonds in the synthetic resin can be adjusted via the content of glycidyl methacrylate in the copolymer and the content of epoxide groups in the epoxy resins based on polyphenols and epihalogenohydrin and via the choice of the polyamines used for the reaction. A high content of NH bonds in the resin which carries amino groups and is prepared according to the invention is achieved, for example, by using diamines, such as ethylene- and propylenediamine. The number of NH bonds in the synthetic resin and its molecular weight substantially influence the course of hardening and the crosslinking density. The content of basic nitrogen atoms in the resin which carries amino groups is of importance for its water-solubility and its emulsifying properties after addition of acid.

The synthetic resins which contain NH bonds and are prepared according to the invention can be reacted via their amino groups, and if appropriate also via their hydroxyl groups, with resins and/or other compounds which carry functional groups and can thus be hardened or modified. Examples which may be mentioned are

- epoxide compounds and/or epoxy resins,
- compounds and/or resins which carry double bonds capable of Michael addition,
- isocyanates and/or resins which carry isocyanate groups, including those in the form of masked products,
- amino resins, for example urea resins and melamine resins,
- compounds and/or resins which contain carboxylic acid and/or carboxylic acid ester and/or carboxylic acid anhydride groups capable of amide and-/or imide formation.

It may also be advantageous here to combine several resins or compounds with the synthetic resins which contain NH bonds and are prepared according to the invention, in order to achieve improved technological properties.

The reactivity of the resins which carry amino groups and are prepared according to the invention can be utilized 1. for self-crosslinking
2. for hardening of the resin which carries amino groups with one or more combination partners or
3. for modification of the synthetic resin which contains NH bonds.

Re (1): Self-crosslinking of the resins which carry amino groups, are based on polyphenol and epihalogenohydrin and are prepared according to the invention occurs at an adequate speed only at temperatures above 180° C..

The polymer resins prepared only with methacrylic esters harden at temperatures above 150° C. In order to obtain products which harden by themselves below 150° C., functional groups which react with the amino groups at lower temperatures can be incorporated in a controlled manner into polymer resins which carry amino groups and are prepared according to the invention. One possibility consists in incorporation of relatively reactive ester groups into the polymer, that is to say those ester groups which are hydrolysed more readily than the methacrylic acid esters incorporated, for example by co-using maleic acid esters or acrylic acid esters during the preparation of the glycidyl methacrylate copolymer. Low reaction and distillation temperatures and a low solids content in the reaction mixture must of course be chosen in the reaction of such glycidyl methacrylate copolymers with polyamines, so that premature crosslinking during the preparation of the polymer resins which carry amino groups is avoided. Synthetic resins which contain NH bonds and are prepared according to the invention and which undergo self-crosslinking below 150° C. are also obtained if the reaction between the polyamine and the polyfunctional compound which carries epoxide groups is not brought to completion, so that the resin which carries amino groups still contains glycidyl groups. In this case, it is necessary for the reaction of the polyfunctional compound which carries epoxide groups with a volatile polyamine in excess to be carried out in a particularly low temperature range, for example at 50° to 70° C., and for the excess of polyamine to be removed, according to the invention, at temperatures below 50° C. under reduced pressure.

Re (2): Resins which carry amino groups and contain residual glycidyl groups or relatively reactive ester groups have a limited storage stability. To build up storage-stable synthetic resins, complete reaction of the glycidyl groups with the polyamine and the use of epoxide compounds which contain no groups which can be hydrolysed or only groups which cannot readily be hydrolysed is necessary.

Using such storage-stable resins which contain NH bonds and are prepared according to the invention, it is possible to formulate two-component systems which already harden at room temperature or below, for example down to −20° C., depending on the reactivity of the combination partner. It is also possible, however, for one-component systems which harden at higher temperatures, for example up to 200° C., preferably up to 150° C., to be formulated with less reactive combination partners.

Re (3): The resins which contain NH bonds and are prepared according to the invention can be further modified to give products which can also be hardened, by reacting their functional groups, in particular the amino groups, with suitable reaction partners, in particular with those which contain the abovementioned functional groups, to give precondensates such that these still contain reactive groups which guarantee hardening of the products by themselves or by foreign agents.

Catalysts can be employed in the hardening of the abovementioned systems and precondensates, these being matched to the particular system in a manner known to the expert. For example, acids, such as salicylic acid, tertiary amines or aminophenols, such as dimethylaminophenol, are suitable for systems of resins which contain NH bonds and are prepared according to the invention and epoxy resins.

Examples of resins and compounds with functional groups for hardening or modification of the polymer resins which carry amino groups and are prepared according to the invention are listed below:

Epoxide compounds. These include aliphatic polyepoxide compounds, such as epoxidized oils, for example epoxidized linseed oil or epoxidized soybean oil, epoxidized cyclic compounds, for example vinylcyclohexene diepoxide, glycidyl ethers of hydrogenated bisphenol A, 3,4-epoxycyclohexylmethyl 3,4-epoxycyclohexanecarboxylate, epoxy resins based on epichlorohydrin and polyhydric alcohols, for example based on pentaerythritol, trimethylolpropane or sorbitol, and glycidyl esters of aliphatic polycarboxylic acids.

Aromatic epoxy resins are furthermore to be mentioned here, such as polyglycidyl ethers of polyhydric phenols, for example glycidyl ethers of 4,4'-diphenylolmethane or -propane, or polyglycidyl ethers of novolacs, glycidyl esters of aromatic polycarboxylic acids, for example terephthalic acid diglycidyl ester, or glycidyl methacrylate copolymers of aromatic monomers. Of these, combinations of the resins which carry amino groups and are prepared according to the invention with polyglycidyl ethers of polyhydric phenols, such as ®Beckopox EP 140, EP 301 and EP 304 from Hoechst AG (glycidyl ethers based on bisphenol A with epoxide equivalent weights of 190, 490 and 900 respectively) are distinguished by a particular reactivity, so that hardening in the temperature range from 20° to 80° C. is possible;

Compounds or resins which carry double bonds capable of Michael addition. Possible examples of these are acrylic and/or methacrylic acid esters of polyhydric alcohols, such as trimethylolethane triacrylate or trimethylolpropane triacrylate and/or the corresponding methacrylic acid esters, butanediol diacrylate and/or unsaturated polyesters based on fumaric and/or maleic acid. These polyesters can additionally contain in the carboxylic acid component up to 70%, preferably up to 30%, of saturated carboxylic acid units which are at least dibasic and contain no double bonds capable of Michael addition, such as ortho-, iso- or terephthalic acid, tetrahydrophthalic acid, hexahydrophthalic acid or adipic acid. Instead of acids, the corresponding anhydrides can of course also be used as the starting substances in the preparation of the polyesters. Possible alcohols for the preparation of the unsaturated polyesters are preferably diols, such as ethylene glycol, 1,2- and 1,3-propanediol, diethylene glycol and/or dipropylene glycol. Combinations of polymer resins according to the invention with acrylic esters which are at least trifunctional, such as glycerol, trimethylolethane triacrylate, trimethylolpropane triacrylate or pentaerythritol tetraacrylate, are particularly reactive. Such combinations also harden very rapidly below room temperature;

Isocyanate compounds. Suitable isocyanate compounds are aliphatic, cycloaliphatic, araliphatic, aromatic and/or heterocyclic mono- and polyisocyanates, for example ®Desmodur N (tradename for a polyisocyanate based on hexamethylene diisocyanate), isophorone diisocyanate, toluylene diisocyanates and diphenylmethane diisocyanate. Combinations with resins which carry polyisocyanates or isocyanate groups crosslink by themselves very rapidly even at temperatures below 0° C. Small amounts, for example up to 30%, preferably 1 to 20%, of the polymer resins which contain NH bonds and are prepared according to the invention are therefore already sufficient to harden polymer resins which carry hydroxyl groups, such as acrylate resins, in the presence of polyisocyanates at room temperature;

Masked isocyanates. The polyisocyanates and/or resins which carry isocyanate groups mentioned in the preceding paragraph can be used with customary masking agents, such as phenols, alcohols, malonic acid esters, acetoacetic acid esters or ε-caprolactam, for combinations with masked polyisocyanates. These combinations are stable at room temperature and in general harden only at temperatures above 100° C. In special cases, for example if acetoacetic acid esters are used for masking, crosslinking may also already occur below 100° C.;

Amine resins. Possible amine resins are, for example, commercially available urea resins and melamine resins. The hardening temperature of such combinations depends on the build-up of the urea resins and melamine resins. Thus, for example, combinations with melamine resins of the hexamethoxymethylmelamine type only harden at temperatures above 150° C., whilst combinations with more reactive melamine resins which are prepared with less formaldehyde and/or are etherified with secondary or tertiary alcohols already crosslink below 100° C.;

Carboxylic acid, carboxylic acid ester and carboxylic acid anhydride resins. If the resins which carry amino groups and are prepared according to the invention are combined with compounds or resins which contain carboxylic acid and/or carboxylic acid ester and/or carboxylic acid anhydride groups, carboxylic acid amide or imide formation occurs. Such reactions take place, for example, with saturated alkyd resins, such as those based on isononanoic acid, phthalic anhydride and trimethylolpropane, since these resins also contain carboxyl groups in addition to the ester groups. The hardening temperature depends on the reactivity of the carboxylic acid, carboxylic acid ester or carboxylic acid anhydride groups contained in the combination partner. Thus, for example, with polyfunctional compounds or resins which carry reactive carboxylic acid ester bonds of malonic acid or acetoacetic acid, it is possible to obtain combinations according to the invention which already crosslink at 80°–140° C. with the resins which contain amino groups and enable shaped articles to be formed, whilst the crosslinking temperature of the combinations with the saturated alkyd resins mentioned is preferably above 150° C.

To overcome compatibility problems or to introduce "hard" or "soft" molecular segments, it may be advantageous for the resin which carries amino groups and is prepared according to the invention to be precondensed with one of the abovementioned combination partners and, if appropriate, for the resulting precondensate to be combined with other reaction partners amongst those mentioned above. If esters of air-drying fatty acids, such as soybean oil fatty acid or linseed oil fatty acid, are used, the precondensation, that is to say the amide or imide formation reaction which takes place between the amino groups of the resin prepared according to the invention and the ester or carboxylic acid groups above 100° C., is advantageously carried out with exclusion of air. The combinations thus obtained as precondensates then harden in a similar manner to air-drying alkyd resins with atmospheric oxygen at room temperature, but in contrast to these are distinguished by improved initial drying coupled with good complete drying, if the resin which contains NH bonds and is obtained according to the invention is prepared on the basis of a suitable glycidyl methacrylate copolymer of "hard" formulation. Possible esters of air-drying fatty acids here are those of monohydric alcohols, for example of methanol, or polyhydric alcohols, including those products in which some of the hydroxyl groups of the polyhydric alcohol are esterified with saturated carboxylic acids, as in long oil alkyd resins with phthalic acid.

With an appropriate choice of the resins which carry amino groups and are prepared according to the invention and the combination partners, the combinations according to the invention can be hardened within a wide range to give shaped articles, in particular sheet-like articles, such as coatings, but also adhesive layers and joints with desirable properties, such as a good resistance to solvents and weathering. The resins prepared according to the invention or the resulting combinations and/or modifications can be used for the production of shaped articles from solution in organic solvents or, after addition of acid, from aqueous systems, that is to say solutions in water-containing solvents or dispersions. Use as a solid resin, for example as a binder for powdered lacquers, is also possible.

The resins which contain NH bonds and are prepared according to the invention are particularly suitable for processing from an aqueous solution or aqueous dispersion, since the water-solubility, water-dispersibility and emulsifying capacity for hydrophobic combination partners of the binders according to the invention can be achieved by addition of acid, in particular carboxylic acid, due to the formation of cationic groups. The customary processes, such as cataphoresis, can be used for the production of coatings from these aqueous dispersions or aqueous solutions.

The use of the resins prepared according to the invention or compounds which have become water-soluble after protonation as emulsifiers and/or protective colloids for aqueous-cationic polymer dispersions should therefore be emphasized. To prepare such dispersions, monomers or mixtures thereof are polymerized in an aqueous solution of the resins or compounds obtained according to the invention in protonated form with known water-soluble catalyst systems which donate free radicals, for example those based on ammonium persulfate. Examples of the monomers used are vinyl esters, such as vinyl acetate, propionate or versatate, acrylic esters, such as methyl, ethyl, hydroxyethyl, butyl or 2-ethylhexyl acrylate, methacrylic esters, such as methyl, ethyl, butyl, 2-ethylhexyl or hydroxyethyl methacrylate, styrenes, such as styrene, α-methylstyrene and vinyltoluene, the dimethyl, dibutyl and di-2-ethylhexyl esters of maleic and fumaric acid, acrylamide and methacrylamide and derivatives thereof.

The desired properties in respect of water-solubility and emulsifying capacity after addition of acid can be established by varying the content and nature of basic nitrogen atoms and, if appropriate, also by introducing further hydrophilic groups, for example hydroxyl groups and/or carboxylic acid amide groups, by co-using hydroxyethyl methacrylate and/or methacrylamide in the preparation of the glycidyl methacrylate copolymers. It is thus possible to specify the desired ratio between hydrophilic and hydrophobic portions, that is to say the HLB values of the products prepared according to the invention. Using products optimized in this manner, it is possible, after addition of acid, to prepare storage-stable aqueous solutions or aqueous dispersions from the resins which contain NH bonds and are prepared according to the invention, by themselves or in combination with hydrophobic combination partners, without using low molecular weight emulsifiers.

Since the compatibility properties of the products obtained according to the invention with the polymers contained in the cationic aqueous dispersions can be influenced via the monomers in the glycidyl methacrylate copolymer and its molecular weight or via the structure and the molecular weight of the epoxy resin based on polyphenol, emulsifiers and protective colloids for cationic aqueous polymer dispersions can be prepared as tailor-made products, which can furthermore be crosslinked via the NH bonds, by the process according to the invention.

In the protonation of synthetic resins dissolved in water-immiscible organic solvents, the organic solvent can initially be distilled off or replaced by a higher-boiling water-miscible solvent by distillation. For the preferred use of the products prepared according to the invention, the protonation is carried out in a solution of the water-immiscible solvent, if appropriate after addition of water-miscible solvents, and the organic solvent is removed completely by steam distillation after the protonation. By choosing solvents which are volatile and water-immiscible, it is furthermore possible for these to be recovered almost completely in a reusable quality, that is to say they are not contaminated with amines.

The protonation of the synthetic resins which contain NH bonds and are prepared according to the invention can be carried out in a known manner. Examples of suitable acid components are, inter alia, formic acid, acetic acid, glycolic acid, lactic acid and gluconic acid. At least temporary formation of a clear solution is to be aimed for in the protonation.

The viscosity properties on dilution of the acidified aqueous solution and/or dispersion can also be influenced by varying the hydrophilic and hydrophobic portions in the resin which carries amino groups and is prepared according to the invention.

The binders prepared according to the invention can be processed to shaped articles, in particular sheet-like shaped articles, with or without pigments and/or fillers. The particular envisaged processing of the binder/pigment/filler combination must be taken account of when choosing the pigments and fillers. If the binders used according to the invention are employed, for example, as an aqueous solution or dispersion in which the amino groups are present as cations, alkaline pigments or fillers, such as zinc oxide or calcium carbonate, may not of course be employed. Acid pigments or fillers can influence certain crosslinking reactions, such as the reaction with double bonds capable of Michael addition, by salt formation or conversion of the basic nitrogen groups into cations.

It is of course possible in all cases for mixtures to be employed instead of uniform products, thus, for example, mixtures of polyamines and/or mixtures of several glycidyl methacrylate copolymers or mixtures of several epoxy resins based on polyphenol/epichlorohydrin can also be employed in the reaction of the copolymers.

In the examples, the parts (p) and % relate to the weight. The amine numbers are always based on the solid.

The content of free polyamines was determined as follows:

(a) Ethylenediamine in polymer solutions: 40 g of the resin solution were shaken twice with 80 g of water for half an hour and the aqueous phases separated off were combined and clarified by filtration. The filtrate was then brought to pH 2 with hydrochloric acid and evaporated to dryness in a thin film evaporator in vacuo at 40° C. The residue was taken up in methanol and the mixture was brought to pH 9 with alcoholic KOH. An aliquot portion of this solution was determined in a gas chromatograph in comparison with dilute ethylenediamine solutions.

(b) Ethylenediamine, diethylenetriamine and triethylenetetramine in solid resins: 25 to 30 g of finely ground solid resin were stirred with 50 ml of distilled water in the cold for 2 hours and the solid resin was separated off from the aqueous extract by centrifugation. Weighed portions of 10 g of the aqueous extract were titrated with 0.1N aqueous acid.

EXAMPLES

1. Polyamine reaction products of polyphenol glycidyl ethers 1.1a 144 p of ethylenediamine were introduced into a solution of 1,600 p of Beckopox EP 307 from Hoechst AG (solid epoxy resin based on bisphenol A, epoxide equivalent 1,550 to 2,000) in 1,067 p of toluene at room temperature in the course of 5 minutes, with stirring (NH/ a ratio 10.8:1). The homogeneous solution was kept at the reflux temperature for 5 hours and a recycling codistillation with a separator was then established. (If the excess ethylenediamine used is not separated off from the toluene phase in the separator, a small amount of water per hour is introduced into the reaction vessel until separation between the ethylenediamine and toluene phase takes place in the separator). When the ethylenediamine phase in the separator, which contained little water, no longer increased during further recycling codistillation, this lower ethylenediamine layer was separated off, the temperature in the reaction vessel was measured and 300 p of water per hour were metered into the reaction mixture, this being stirred vigorously and heated so that the temperature did not fall more than 10° to 12° C. below the temperature measured before the addition of water. The recycling codistillation was ended when, on interruption of the addition of water after complete removal of the water from the reaction vessel and the separator, 100 g of the toluene distillate consumed less than 0.4 ml of 0.1N methanolic hydrochloric acid. Resulting product: 39% of solids, amine number, based on the solid resin, 48, content of free ethylenediamine 9 ppm.

1.1b To convert the product from 1.1a into an aqueous dispersion, 50 p of diethylene glycol dimethyl ether and 1.77 p of formic acid were added to 50 p of the resin/toluene solution, warmed to 100° C. On warming to 100° to 110° C., this mixture gave a clear solution after about 5 minutes, which then became cloudy again. This mixture was metered into 150 p of water at 90° to 95° C. and the toluene was distilled off as an aqueous azeotropic mixture under atmospheric pressure.

The resulting aqueous dispersion had the following properties: resin content 16.6%, particle size (weight-average value) measured with a Nanosizer 155 nm, or measured with an aerosol spectrograph 143 nm, particle dispersity 4.5, no settling on storage for 4 weeks.

1.2 The procedure followed was according to Example 1.1a and xylene was employed instead of toluene as the solvent and entraining agent. The recycling codistillation was furthermore carried out under reduced pressure, so that the temperature of the reaction mixture after removal of most of the excess ethylenediamine and before the start of the addition of water was 80° C. The addition of water and supply of heat to the reaction mixture were controlled so that the temperature fell on the one hand 7° to 13° C. to 73° to 67° C. (Example 1.2a) and on the other hand 20° to 25° C. to 60° to 55° C. (Example 1.2b). The water collected in the separator had an amine number of 118 mg of KOH/g in Example 1.2a (335 p of water distillate) and an amine number of 78 in Example 1.2b (394 p of water distillate). In both Examples 1.2a and 1.2b, the recycling codistillation was continued until, on interruption of the addition of water after complete removal of the water from the reaction vessel and separator, 100 g of xylene distillate consumed 9 ml of 0.1N methanolic hydrochloric acid. In both cases, the resulting end products had the following same data: solids 42%, amine number, based on the solid resin, 48 mg of KOH/g, content of free ethylenediamine 40 ppm. Comparison of Examples 1.2a and 1.2b shows that the removal of the diamine used in excess can be accelerated by keeping the drop in temperature in the reaction vessel on the addition of water as far as possible to less than 15° C. during the circulatory distillation.

1.3 300 p of diethylenetriamine were added to a solution of 770 p of Beckopox VEP 2303 from Hoechst AG (solid epoxy resin based on bisphenol A, epoxide equivalent weight 750 to 830) in 700 p of Solvesso 200 at room temperature in the course of 5 minutes, with stirring (NH/ a ratio 15.2:1), the solution was then kept at 120° C. for 5 hours and circulatory distillation was then set up under reduced pressure. Under a constant pressure of 120 mm Hg and vigorous recycling codistillation, the reaction mixture had a temperature of 160° C. Water was then added dropwise, with vigorous stirring, whereupon the temperature of the reaction solution dropped by about 3° C. and an aqueous amine phase separated out in the separator. After addition of 500 p of water in the course of 10 hours, a product which had a solids content of 40%, was clear at 60° C. and contained 40 ppm of free diethylenetriamine was obtained.

2. Polyamine reaction products of glycidyl methacrylate copolymers 2.1 183 p of ethylenediamine were added to 1,200 p of a glycidyl methacrylate copolymer solution with a resin content of 60%—prepared by solution polymerization of 216 p of glycidyl methacrylate, 1,296 p of n-butyl methacrylate, 540 p of styrene and 108 p of methyl methacrylate with 108 p of azodiisobutyronitrile in xylene at 80° to 100° C.—at room temperature and the homogeneous solution was kept at 60° C. for 10 hours, with stirring. A recycling codistillation was then set up under 25 mm Hg.

The temperature of the reaction mixture thereby established itself at 51° C. When the addition of a few drops of water caused no further increase in the lower ethylenediamine phase in the separator, the lower phase, which consisted of almost pure ethylenediamine, was separated off and metering of 130 p of water per hour was started. The reaction mixture, the temperature of which dropped by about 10° C. to 40° C., was thereby heated and stirred vigorously. After throughput of 500 p of water, a xylene solution which had a resin solids content of 53.4%, a content of free non-bonded ethylenediamine of less than 30 ppm, an iodine color number of 1 and no amine odor was obtained. The acrylate resin containing amine groups which was dissolved in the xylene had an amine number of 64 mg of KOH/g.

3. Comparison Examples 3.1 In accordance with the statements of Example 1 of German Offenlegungsschrift No. 2,737,375, 385 p of Beckopox VEP 2303 were dissolved in 600 p of triethylenetetramine at 70° C. in the course of 2 hours, with stirring, and the solution was heated at 260° C. under a pressure of 15 mm Hg. After the excess triethylenetetramine had been distilled off, the mixture was kept at 260° C. under a vacuum of 15 mm Hg for another hour (product I) and under a vacuum of 1 mm Hg for a further hour (product II). The products thus obtained contained more than 25,000 ppm of free triethylenetetramine (product I) or more than 10,000 ppm of free triethylenetetramine (product II).

3.2 438 p of Beckopox VEP 2303 were dissolved in 561 p of diethylenetriamine at 70° C. in the course of 2 hours, with stirring, and the solution was heated at 260° C. under a pressure of 15 mm Hg. When the excess diethylenetriamine had been distilled off, the mixture was kept at 260° C. under 15 mm Hg for another hour (product I) and under 1 mm Hg for a further hour (product II). Product I still contained 20,000 ppm and product II still contained 3,500 ppm of free diethylenetriamine.

3.3 In accordance with the statements of Example 2.2.1 of German Offenlegungsschrift No. 3,412,657, 190 p of glycidyl methacrylate copolymer solution with a resin content of 52.6% and an epoxide number of 1.248, based on the solid resin—prepared by solution polymerization of 96 p of glycidyl methacrylate, 704 p of styrene and 14.4 p of ditert.-butyl peroxide in xylene at 134° to 140° C.—were combined with 31 p of ethylenediamine, 30 p of tetrahydrofuran and 15 p of diethylene glycol dimethyl ether at room temperature to give a homogeneous solution, the solution was then boiled under reflux for 15 hours and the excess diamine was distilled off with a solvent, the volume amount distilled off being replaced by xylene. The distillation was discontinued when the distillate was free from amine, that is to say the consumption of 0.1N HCl was less than 100 ml per 100 g of distillate weighed out. The resulting product had a solids content of 54.4% and an amine number of 81.6 mg of KOH equivalents/g of solid resin. On removal of the excess diamine, 1,500 p of xylene contaminated with ethylenediamine were obtained.

I claim:

1. A process for the preparation of a soluble synthetic resin which is free from monomeric amines and contains NH bonds by reaction of (A) a compound which carries epoxide groups with (B) a polyamine, which comprises carrying out the reaction in a homogeneous phase system in the absence or presence of a resin solvent, the polyamine (B) being employed in excess and the resulting reaction product being freed from unreacted portions of the polyamine by recycling codistillation in the presence of a resin solvent with the addition of water and supply of heat.

2. The process as claimed in claim 1, wherein the resin solvent is added after the reaction of components (A) and (B).

3. The process as claimed in claim 1, wherein component (B) is employed in an excess such that the ratio of the NH bonds in component (B) to the glycidyl groups a in component (A) is 8:1, preferably 12:1 to 36:1.

4. The process as claimed in claim 1, wherein the recycling codistillation is carried out until 100 g of the anhydrous resin solvent distilled off consume 1 to 50 ml of 0.1N hydrochloric acid and the reaction products have a content of monomeric polyamine of less than 50 ppm.

5. The process as claimed in claim 1, wherein the addition of water and supply of heat energy to the synthetic resin solution is carried out such that the water does not accumulate in the distillation vessel.

6. The process as claimed in claim 1, wherein ethylenediamine is employed as the polyamine and the resin solvent employed is a resin solvent with a boiling point under atmospheric pressure in the range from 140° to 200° C.

7. The process as claimed in claim 1, wherein an epoxy resin prepared from a polyphenol and epihalogenohydrin, preferably epichlorohydrin, is employed as the compound which carries epoxide groups.

8. The process as claimed in claim 1, wherein a glycidyl methacrylate copolymer with styrene, a substituted styrene or meethacrylic acid ester as the comonomer is employed as the compound which carries epoxide groups.

9. The process as claimed in claim 1, wherein the compound (A) which carries epoxide groups also contains other functional groups.

10. A coating or impregnation composition prepared by using a synthetic resin obtainable as claimed in claim 1.

11. The coating or impregnation composition as claimed in claim 10, wherein the synthetic resin is employed in combination with a crosslinking agent.

12. The coating or impregnation composition as claimed in claim 11, wherein the synthetic resin is employed in modified form.

13. The coating or impregnation composition as claimed in claim 12, wherein the modification is carried out by protonation in which the amino groups of the synthetic resin are reacted with an acid to form a salt.

* * * * *